May 15, 1962 — E. W. LARSEN — 3,034,740
COLLAPSIBLE ARBORS
Original Filed Nov. 6, 1953
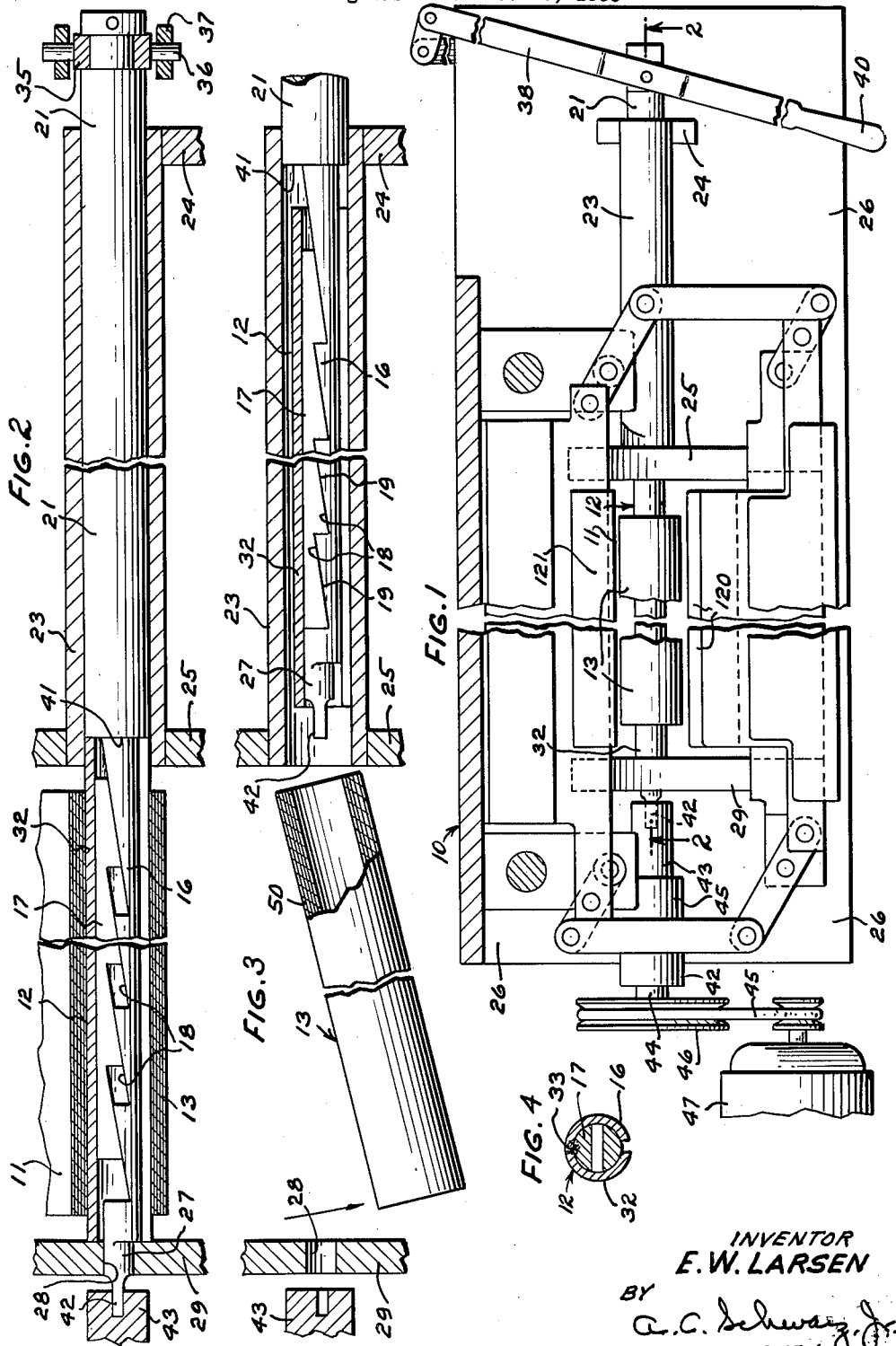
INVENTOR
E. W. LARSEN
BY
A. C. Schwarz, Jr.
ATTORNEY the United States Patent Office 3,034,740
Patented May 15, 1962

3,034,740
COLLAPSIBLE ARBORS
Einer W. Larsen, Palatine, Ill., assignor to Western Electric Company, Incorporated, New York, N.Y., a corporation of New York
Original application Nov. 6, 1953, Ser. No. 390,662, now Patent No. 2,916,224, dated Dec. 8, 1959. Divided and this application May 25, 1959, Ser. No. 815,650
6 Claims. (Cl. 242—72.1)

This invention relates to collapsible arbors for winding strip material thereon and more particularly to arbors capable of being expanded and collapsed in response to axial movement thereof. The present application is a division of the copending application of E. W. Larsen on a capacitor-winding machine, Serial No. 390,662, filed November 6, 1953, now Patent No. 2,916,224 issued December 8, 1959.

An object of the present invention is to provide an effective and relatively simple collapsible arbor for winding material thereon to facilitate the removal of the wound material therefrom.

Another object of the invention is the provision of an arbor having a split spring sleeve forming a substantially complete cylindrical surface for supporting the material to be wound thereon and capable of being actuated to expanded and collapsed conditions.

A device illustrating certain features of the invention may include an arbor member mounted for rotation and for axial movement and having formed thereon a first parti-cylindrical arbor element with oblique cam surfaces engaging cam surfaces of a second parti-cylindrical arbor element. A split spring sleeve secured to the second arbor element encircles the arbor elements and forms a substantially complete cylindrical surface for supporting the material to be wound and the sleeve is capable of being actuated into expanded and collapsed conditions in response to relative movement between the arbor elements. As the arbor is moved axially to a predetermined winding position, a first stationary abutment engages the sleeve and effects relative movement between the arbor elements to actuate the sleeve into expanded position. After the material has been wound onto the arbor, the arbor is retracted to eject the wound material therefrom and one end of the wound material engages a second abutment and its movement is arrested thereby causing relative movement between the arbor elements and the actuation of the sleeve to collapsed position to facilitate the withdrawal of the arbor from the wound material.

Other objects and advantages of the invention will become apparent by reference to the following detailed description and the accompanying drawings illustrating a preferred embodiment thereof in which:

FIG. 1 is a fragmentary plan sectional view of a capacitor-winding machine showing the collapsible arbor thereon;

FIG. 2 is a fragmentary vertical longitudinal sectional view through the arbor taken on line 2—2 of FIG. 1 and showing the arbor in its expanded and winding position;

FIG. 3 is a vertical sectional view similar to FIG. 2 showing the arbor in its collapsed and retracted position; and FIG. 4 is a fragmentary cross-sectional view through the composite arbor in expanded position.

Referring to FIG. 1 of the drawings, the machine 10 shown therein is adapted to wind a pair of metallized strips 11 of dielectric material onto a composite arbor 12 to form a capacitor 13.

The arbor 12 is capable of being collapsed and expanded and comprises a pair of parti-cylindrical arbor elements 16 and 17 (FIGS. 2 and 3) having cylindrical outer surfaces and a plurality of inner sloping cam surfaces 18 and 19, respectively, engaging each other for supporting the element 17 for transverse oblique movement on the element 16 in response to relative longitudinal movement therebetween. The arbor element 16 has an enlarged cylindrical shank 21 in the form of a shaft supported for rotation and axial reciprocation in a bearing 23 which is secured to brackets 24 and 25 mounted on a base 26. The cylindrical end portion 27 of the element 16 is movable into and rotatably supported in a bearing aperture 28 in a bracket 29 fixed to the base. A split sleeve 32 of spring metal encircles the arbor elements 16 and 17 and is secured to the element 17 as by spot welding 33 (FIG. 4). The split sleeve 32 and the element 17 secured thereto cooperate with the element 16 of the arbor to form the collapsible and expansible portion of the arbor on which the strips 11 are to be wound.

The shank 21 of the arbor extends beyond the bearing 23 and has a shifting collar 35 mounted for rotation thereon and against axial movement relative thereto. The collar 35 has a pair of pins 36 which fit into apertures in a yoke portion 37 of a shifting lever 38 which is pivotally supported at one end and has a handle 40 by means of which the lever may be actuated to reciprocate the arbor to a forward and expanded position (FIG. 2) and to a retracted and collapsed position (FIG. 3).

As the arbor is advanced to its forward position, the sleeve 32 engages the bracket 29 and the sleeve 32 and the arbor element 17 are held against axial movement while the arbor element 16 continues to advance relative thereto and actuate the sleeve into expanded position as shown in FIG. 2. The arbor is yieldably held in its expanded position by the sleeve 32 which in this condition is substantially circular in cross section and provides a substantially complete cylindrical supporting surface on which the capacitor is wound. The sleeve 32 and arbor elements 16 and 17 slide into the bearing 23 when the arbor is retracted to effect the release and ejection of the capacitor 13 as shown in FIG. 3. With the arbor 12 in its forward winding position as shown in FIG. 2, one end of the sleeve 32 engages the bracket 29 and the other end abuts a shoulder 41 on the arbor and serves to stop the advancing movement of the arbor when the sleeve 32 has been actuated to its fully expanded position.

At the forward end of the arbor 12, the element 16 is provided with a rectangular connector element 42 which is adapted to engage a similarly shaped socket formed in a drive member 43 on one end of a shaft 44 (FIG. 1) which is journaled in a bearing bracket 45 mounted on the base 26. The shaft 44 is connected through a pulley and belt drive connection 46 to a motor 47 for rotating the shaft 44 and the arbor 12. After a capacitor 13 has been wound on the arbor as shown in FIG. 2, the arbor may be moved to the right to withdraw it from and effect the ejection of the capacitor. As the arbor moves to the right, the end of the wound capacitor engages the bearing 23 and its movement is arrested thereby and the frictional engagement between the capacitor 13 and the sleeve 32 serves to momentarily arrest the movement of the sleeve 32 and the arbor element 17 while the element 16 of the arbor continues its movement relative thereto to effect the collapse of the arbor and permit the withdrawal thereof from the wound capacitor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. A collapsible arbor for winding material thereon comprising a pair of cooperable parti-cylindrical arbor elements having oblique surfaces engageable with each other for effecting transverse movement between said elements in response to relative longitudinal movement therebetween, a split spring sleeve supported on and surrounding said arbor elements and fixed to one of them to form a substantially complete cylindrical surface for supporting the material to be wound, means for rotating the arbor elements to wind the material thereon, means including a member engageable with one end of said sleeve for effecting relative longitudinal movement in one direction between said arbor elements and the actuation of said sleeve to expanded position, and means including a member engageable with one end of the wound material on the sleeve for effecting relative longitudinal movement in the opposite direction between said arbor elements and the actuation of said sleeve to collapsed position.

2. An expansible arbor for winding material thereon comprising a pair of opposed arbor elements having cylindrical outer surfaces and cooperable inner cam surfaces, a split spring sleeve supported on and surrounding said arbor elements and fixed to one of said elements, said cam surfaces serving to effect transverse movement between said arbor elements and the actuation of said sleeve into expanded and collapsed conditions in response to relative longitudinal movement between said elements, means for rotating the arbor elements to wind the material onto the sleeve, a pair of spaced abutment members between which the material is wound onto said sleeve, one of said abutment members being engageable with one end of the sleeve and the other abutment member being engageable with one end of the wound material, and means for effecting relative longitudinal movement between said pair of arbor elements and said pair of abutment members to effect the actuation of said split sleeve to expanded and collapsed conditions.

3. A composite arbor for winding material thereon comprising a shaft having a first arbor element extending from one end thereof provided with a cylindrical outer surface and a plurality of sloping inner cam surfaces, a second arbor element having a cylindrical outer surface and a plurality of sloping inner cam surfaces engageable with the cam surfaces of said first arbor element, a split sleeve supported on and surrounding said arbor elements and fixed to said second arbor element, said sloping cam surfaces serving to effect transverse movement to said second arbor element and the actuation of said split sleeve to and from expanded and collapsed positions in response to relative longitudinal movements between said arbor elements, means for supporting said shaft for rotation and for axial movement, means for rotating said shaft to wind the material onto the split sleeve, means for moving said shaft axially in opposite directions, and means engageable with the sleeve to arrest its movement and effect the actuation of the sleeve into expanded position in response to axial movement of the shaft in one direction, said supporting means serving to engage the wound material on the sleeve and arrest its movement to effect the collapse of the sleeve in response to movement of said shaft in the opposite direction.

4. A collapsible arbor for a strip-winding machine comprising a pair of parti-cylindrical arbor elements having cylindrical outer surfaces and a plurality of sloping inner cam surfaces engageable with each other for supporting one of said elements on the other, said sloping cam surfaces serving to impart transverse movement to said one element to and from expanded and collapsed positions in response to longitudinal movement of the other element relative to said one element, a split spring sleeve surrounding said arbor elements and fixed to said one arbor element for longitudinal movement therewith and for transverse expanding and contracting movements to and from expanded and contracted positions in response to movement of the other element relative to said one element, means including a pair of members for supporting said arbor elements for rotation and for axial movement to and from an operative position and a retracted position, means for moving said other arbor element to and from said operative and said inoperative positions, means for rotating said other arbor element, one of said supporting members serving to engage the end of said sleeve to arrest the movement thereof at a predetermined point in the movement of said other arbor element to said operative position to effect relative axial movement between said arbor elements into expanded position, the other of said supporting members serving to engage the wound strip on said sleeve during the movement of said other arbor element to said retracted position to arrest the movement of said wound strip and retard the movement of the sleeve in the reverse direction to effect relative axial movement between said elements to said contracted position.

5. In a strip-winding machine, a shaft having a first arbor element with cam surfaces thereon, a second arbor element having surfaces conforming to and engaging said cam surfaces, a split spring sleeve surrounding and supported on said arbor elements and secured to said second arbor element, said sleeve forming a supporting surface on which the strip is to be wound, said sleeve and said second arbor element secured thereto being movable axially relative to said first arbor element and movable laterally into expanded and collapsed positions in response to such relative axial movements, means for supporting said shaft for rotation and for axial movement in one direction to a predetermined operative position and in a reverse direction to a retracted position, means for moving said shaft into said operative and said retracted positions, means for engaging the end of said sleeve to arrest the movement thereof and said second arbor element at a predetermined point prior to the end of the movement of said shaft to said operative position to effect axial movement of said first arbor element relative to said second arbor element and the lateral movement of said sleeve into expanded position, and means engageable with the wound strip during the movement of said shaft to said retracted position to arrest the movement of said wound strip and retard the movement of the sleeve in the reverse direction to effect axial movement of said first arbor element relative to said sleeve and the lateral movement of said sleeve into collapsed position.

6. An expansible arbor for winding material thereon comprising a pair of cooperable arbor elements, means on said arbor elements for imparting transverse movement between said arbor elements in response to relative longitudinal movement therebetween, a split spring sleeve encircling said arbor elements and fixed to one of them, said split sleeve forming a substantially complete peripheral surface for supporting the material to be wound and being movable to and from expanded and collapsed conditions in response to relative longitudinal movement between said arbor elements, means including a member engageable with one end of said sleeve for effecting relative longitudinal movement in one direction between said arbor elements and the actuation of said sleeve to expanded condition, and means including a member engageable with one end of the wound material on said sleeve for effecting relative longitudinal movement in the opposite direction between said arbor elements and the actuation of said sleeve to collapsed condition.

References Cited in the file of this patent

UNITED STATES PATENTS

| | | |
|---|---|---|
| 1,746,976 | Wendt | Feb. 11, 1930 |
| 1,929,673 | Cammen | Oct. 10, 1933 |
| 1,977,668 | Dallas | Oct. 23, 1934 |
| 2,001,347 | Holmes | May 14, 1935 |
| 2,053,815 | De Panthou et al. | Sept. 8, 1936 |
| 2,125,660 | Whalen | Aug. 2, 1938 |
| 2,594,095 | Torregrossa et al. | Apr. 22, 1952 |